United States Patent [19]

Watanabe et al.

[11] Patent Number: 4,623,052

[45] Date of Patent: Nov. 18, 1986

[54] METHOD AND APPARATUS FOR CONTROLLING AN ELECTROMAGNETIC CLUTCH FOR USE ON A VEHICLE

[75] Inventors: Tomoyuki Watanabe; Takashi Shigematsu; Setsuo Tokoro, all of Susono, Japan

[73] Assignee: Toyota Jidosha Kabushiki Kaisha, Toyota, Japan

[21] Appl. No.: 637,837

[22] Filed: Aug. 6, 1984

[30] Foreign Application Priority Data

Aug. 6, 1983 [JP] Japan ................................. 58-14426

[51] Int. Cl.$^4$ ............................................. B60K 27/16
[52] U.S. Cl. ................. 192/21.5; 192/0.032; 192/0.076
[58] Field of Search ............... 192/3.56, 21.5, 0.076, 192/0.075, 0.033, 0.032, 103 R; 361/187, 242

[56] References Cited

U.S. PATENT DOCUMENTS

| | | | |
|---|---|---|---|
| 4,397,379 | 8/1983 | Baudoin | 192/0.032 |
| 4,425,992 | 1/1984 | Makita | 192/0.076 X |
| 4,457,411 | 7/1984 | Hiramatsu | 192/3.56 X |
| 4,466,521 | 8/1984 | Hattori et al. | 192/0.032 |
| 4,494,639 | 1/1985 | Takano | 192/0.076 X |
| 4,514,811 | 4/1985 | Daubenmier et al. | 192/0.076 X |

*Primary Examiner*—George H. Krizmanich
*Attorney, Agent, or Firm*—Oblon, Fisher, Spivak, McClelland & Maier

[57] ABSTRACT

Method and apparatus for controlling an electromagnetic clutch which is incorporated in a power transmission system of a vehicle to transmit an output of an engine to drive wheels, and which includes a solenoid to be energized for an engaging action of the electromagnetic clutch to transmit a torque of the engine to the drive wheels, the torque to be transmitted by the clutch being varied as a function of an electric current to energize the solenoid. The method of apparatus comprises: a step or device for determining a target speed of the engine during a period of the engagement action of the electromagnetic clutch, based on a required output of the engine, and according to a predetermined relation between the target speed and required output of the engine; a step or device for controlling a magnitude of the electric current applied to the solenoid during the period of engagement of the clutch, such that an actual speed of the engine coincides with the determined target speed of the engine, and thereby applying the controlled magnitude of electric current to the solenoid to control the torque to be transmitted by the electromagnetic clutch.

6 Claims, 9 Drawing Figures

METHOD AND APPARATUS FOR CONTROLLING AN ELECTROMAGNETIC CLUTCH FOR USE ON A VEHICLE

BACKGROUND OF THE INVENTION

The present invention relates generally to a method and an apparatus for controlling an electromagnetic clutch for use on a vehicle. More particularly, the invention is concerned with improved technologies for controlling an engaging operation of such an electromagnetic clutch upon starting or during running of the vehicle, without the engaging operation being affected by a variation in torque transmission characteristics between the clutches used on different vehicles, and permitting the individual clutches to provide a consistent power transmission performance, while assuring an equally high level of drivability and fuel economy on the different vehicles.

In the art of a power transmission system of a vehicle, an electromagnetic clutch is used as means for easy control of a torque to be transmitted. An example of such an electromagnetic clutch comprises: a driving rotary member operatively connected to an engine of a vehicle; a driven rotary member operatively connected to drive wheels of the vehicle and cooperating with the driving rotary member to define an annular space therebetween; a mass of magnetic powder accommodated in the annular space between the driving and driven rotary members; and a solenoid which is energized to generate a magnetic force for causing particles of the magnetic powder to be tightly bonded together in the annular space so that the mass of magnetic powder contacts the driving and driven rotary members to transmit a torque from the driving rotary member to the driven rotary member. In this electromagnetic clutch, a value of the torque which is delivered from the driving rotary member (from the engine) to the driven rotary member (drive wheels) is varied as a function of an electric current to be applied to the solenoid. This characteristics of the electromagnetic clutch is utilized to obtain an optimum control of an engaging action of the clutch, at the time of starting the vehicle for example, by increasing a magnitude of electric current to be applied to the solenoid as the engine speed is increased.

The above method of controlling the engaging operation of the electromagnetic clutch is generally advantageous in drivability and specific fuel consumption (fuel economy) of the vehicle. Commonly, the increase in the energization current of the solenoid is controlled relative to the increase in the engine speed according to a predetermined relation between these two variables. For instance, the energization current to be supplied to the solenoid is varied in proportion to a difference between a preset idling speed of the engine and an actual running speed of the engine. In this method, a variation in torque transmission characteristics between clutches on different vehicles will cause an inconsistency in engaging operation between the clutches. Stated in more detail, the torque transmission characteristics in relation to the energization current of the solenoid are inevitably varied from one clutch to another, due to difference in dimensions of the annular space formed between the driving and driven rotary members (the difference being caused due to dimensional tolerances), and due to differences in operating temperature and cumulative operation time of the clutches. Since the variation in the transmission characteristics for such causes is inevitable, it is a common practice that a rate of increase in the solenoid energization current is set at a level which is low enough to assure a high or sufficient drivability of each vehicle, even when the transmission characteristics of the electromagnetic clutch of that vehicle is inclined on the side of lowering the drivability of the vehicle. As a result of the above setting of the increase rate of the solenoid current, the running speed of the engine during an engaging action (partial engagement) of the electromagnetic clutch tends to be unnecessarily higher on the side of causing a loss of output of the engine. Thus, the traditional method and apparatus for controlling the engaging action of an electromagnetic clutch are not considered sufficiently satisfactory in terms of specific fuel consumption, i.e., fuel economy, particularly at the time of starting the vehicle.

SUMMARY OF THE INVENTION

It is accordingly an object of the present invention to provide a method and an apparatus for controlling an electromagnetic clutch for a vehicle, which are capable of permitting optimum engagement of the clutch, and allowing the vehicle to start with high drivability and fuel economy, irrespective of the specific torque transmission characteristics of that clutch in relation to a varying magnitude of electric current to be applied to the clutch.

According to the invention, there is provided a method of controlling an electromagnetic clutch which is incorporated in a power transmission system of a vehicle to transmit an output of an engine to drive wheels, and which includes a solenoid to be energized for an engaging action of the electromagnetic clutch to transmit a torque of the engine to the drive wheels, the torque to be transmitted by the clutch being varied as a function of an electric current to energize the solenoid. The method according to the invention comprises: determining a target speed of the engine during a period of the engaging action of the clutch, based on a required output of the engine, and according to a predetermined relationship between the target speed and the required output of the engine; and controlling a magnitude of the electric current applied to the solenoid during the clutch engagement period, such that an actual speed of the engine coincides with the determined target speed of the engine.

According to the invention, there is also provided an apparatus suitable for practicing the method of the invention described above. The apparatus comprises: first detecting means for detecting an actual speed of the engine; second detecting means for detecting a currently required output of the engine; means for determining a targe speed of the engine during a period of the engaging action of the electromagnetic clutch, based on the required output of the engine, and according to a predetermined relationship between the target speed and the required output of the engine; and current adjusting means for controlling a magnitude of the electric current applied to the solenoid during the clutch engagement period, such that the actual speed of the engine coincides with the determined tartet speed of the engine, and applying the controlled magnitude of electric current to the solenoid to control the torque to be transmitted by the electromagnetic clutch.

In the apparatus of the invention constructed as described above, a targe speed of the engine in the process of engagement of the clutch is determined by the determining means, based on the required output of the engine which has been detected by the second detecting means, and according to a predetermined known relation between the target speed and the required output of the engine. With the target speed of the engine thus determined, the magnitude of electric current to be applied to the solenoid of the clutch under engagement is adjusted by the current adjusting means, such that the actual speed of the engine detected by the first detecting means coincides with the determined target speed of the engine. Thus, the running speed of the engine during the engaging action of the clutch is controlled to vary in conformity with the determined target speed. Therefore, a variation or difference in torque transmission characteristics between individual electromagnetic clutches to be controlled will not give rise to otherwise possible inconsistency in engaging operation between the clutches. In other words, the instant method and apparatus are capable of controlling the engaging action of the electromagnetic clutch so as to permit the vehicle to make a start with a high drivability, and capable of preventing a decrease in specific fuel consumption, which is experienced in the prior art method or apparatus wherein the engaging action of the clutch is controlled to provide a relatively higher speed of the engine for maintaining the drivability of the vehicle at the sacrifice of its fuel economy.

The method and apparatus of the invention is conveniently used for controlling an electromagnetic clutch of magnetic powder type which includes a driving and a driven rotary member operatively connected to the engine and the drive wheels, respectively. The driving and driven rotary members cooperate to define an annular space therebetween, in which a mass of magnetic powder is accommodated. Upon energization of the solenoid, particles of the magnetic powder are tightly bonded together so that the mass of magnetic powder contacts the driving and driven rotary members and thereby transmits the torque from the driving rotary member to the driven rotary member at a rate of transmission corresponding to a variation in the magnitude of electric current applied to the solenoid.

According to an advantageous embodiment of the apparatus of the invention, the first detecting means for detecting the actual speed of the engine comprises a sensor disposed on an ignition system for the engine in order to detect an ignition signal which is applied to the ignition system.

In accordance with another advantageous embodiment of the invention, the second detecting means comprises a sensor for detecting an angle of opening of a throttle valve which is disposed in an intake manifold connected to the engine.

According to a further embodiment of the invention, the current adjusting means comprises a current sensor for detecting a magnitude of electric current actually flowing through the solenoid, and a current feedback regulator for varying an energization voltage of the solenoid such that the magnitude of electric current to be applied to the solenoid coincides with the detected magnitude of electric current actually flowing through the solenoid, irrespective of a variation in impedance of the solenoid.

BRIEF DESCRIPTION OF THE DRAWING

The above and other objects, features and advantages of the present invention will become more apparent from reading the following description of the preferred embodiment taken in conjunction with the accompanying drawing in which.

DETAILED DESCRIPTION OF THE PREFERRED EMBODIMENT

The present invention will be described in detail referring to the accompanying drawing illustrating one preferred embodiment of the invention.

Figure 1:
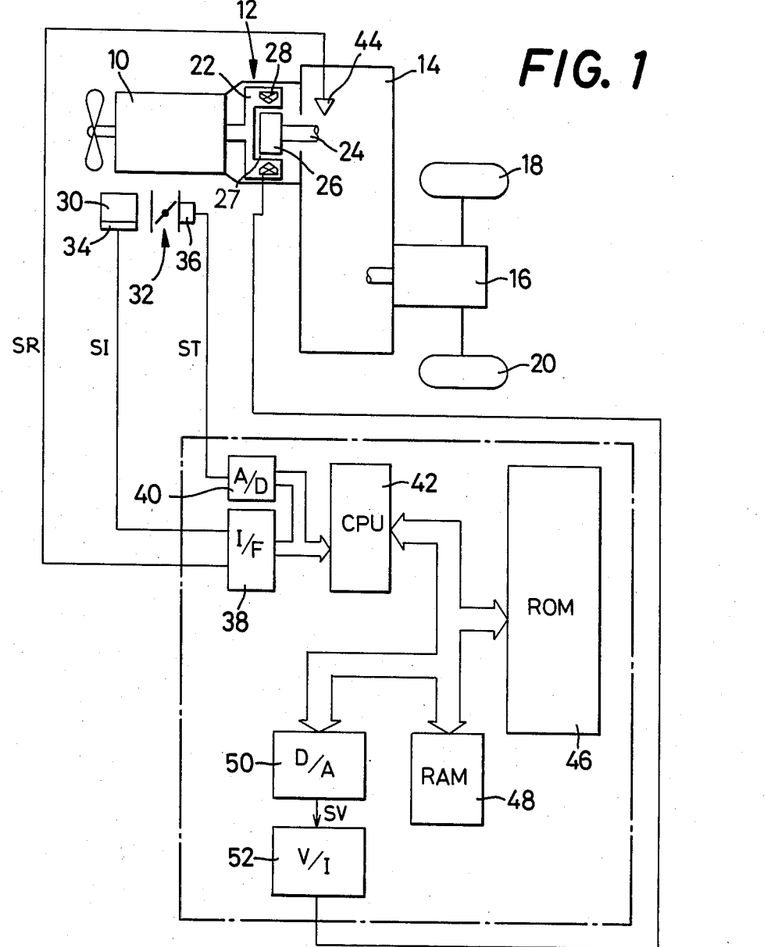
FIG. 1 is a schematic illustration of a power transmission system which incorporates an electromagnetic clutch of magnetic powder type and one embodiment of an apparatus of the invention for controlling the electromagnetic clutch.

There is shown in FIG. 1 an engine 10 of an automotive vehicle, an output torque of which is transmitted to drive wheels 18, 20 via an electromagnetic clutch 12 of magnetic powder type, a transmission 14 and a differential assembly 16. The transmission 14 may be a manual-shift transmission or an automatic continuously variable transmission (so-called "CVT") of belt-and-pulley type.

Figure 2:
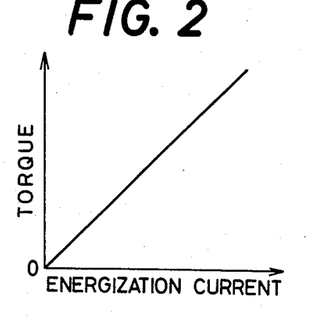
FIG. 2 is a graphical representation of generally known characteristics of the electromagnetic clutch of FIG. 1.

The electromagnetic clutch 12 comprises a yoke 22 serving as a driving rotary member operatively connected to the engine 10, and a rotor 26 serving as a driven rotary member connected to an input shaft 24 of the transmission 14, which shaft 24 is operatively connected to the drive wheels 18, 20. The yoke 22 is disposed radially outwardly of the rotor 26, so that the inner circumferential surface of the yoke 22 cooperates with the outer circumferential surface of the rotor 26 to define an annular space. The clutch 12 uses a mass of magnetic powder 27 accommodated in the annular space between the yoke and rotor 22, 26, and a solenoid 28 which is disposed integrally within the yoke 22 and energized to produce a magnetic force which causes particles of the magnetic powder 27 to be tightly bonded together so that the powder mass contacts the inner and outer surfaces of the yoke and rotor 22, 26, thereby transmitting a torque from the yoke 22 to the rotor 26. The electromagnetic clutch 12 has the characteristics that the torque transmitted by means of the powder mass 27 is varied as a function of an electric current which is applied to the solenoid 28. Stated more specifically, the torque transferred from the yoke 22 (engine 10) to the rotor 26 (drive wheels 18, 20) is increased as the electric current to energize the solenoid 28 is increased, as illustrated in FIG. 2.

An ignition system 30 for the engine 10 is provided with an ignition timing sensor 34 for detecting an ignition signal which is applied to the ignition system 30 to produce a spark within cylinders of the engine 10 to ignite a fuel charge. The ignition timing sensor 34 functions as a detector to detect an actual running speed of the engine 10. The air-fuel mixture is distributed to the engine cylinders through an intake manifold in which is disposed a throttle valve 32 to control the amount of the air-fuel mixture that reaches the cylinders. A throttle position sensor 36 is provided adjacent to the throttle valve 32. This throttle position sensor 36 functions as a detector to detect an output of the engine 10 which is currently required (hereinafter referred to as "required output of the engine"). The ignition timing sensor 34 generates an IGNITION signal SI, for example, two pulses per revolution of the engine 10 in the case where the engine has four cylinders. The IGNITION signal SI is applied to an I/F circuit 38 which converts the IGNITION signal SI into a coded signal representing an interval "te" of the signal SI. This coded signal is fed to a central processing unit 42 (hereinafter called "CPU 42"), which may consist of a microcomputer. The throttle position sensor 36 generates a THROTTLE signal ST which is generally a voltage signal representing an angle of opening of the throttle valve 32. The THROTTLE signal ST is applied to an A/D converter 40 which converts the voltage THROTTLE signal ST into a digital signal, which is fed to the CPU 42. Thus, the CPU 42 receives the input data representing the ignition interval of the engine 10, and the opening angle of the throttle valve 32, which indicate the actual running speed and required output of the engine 10, respectively.

On the other hand, the transmission 14 is provided with a speed sensor 44 which is adapted to detect a rotating speed of the input shaft 24. The speed sensor 44 generates a ROTATION signal SR which is a pulse signal representing a rotating speed of the input shaft 24. The ROTATION signal SR is applied to the I/F circuit 38 which converts the ROTATION signal SR into a coded signal representing an interval "ti" of the signal SR. This coded signal is fed to the CPU 42. In other words, the ROTATION signal SR represents a rotating speed of the rotor 26 of the electromagnetic clutch 12.

Figure 3:
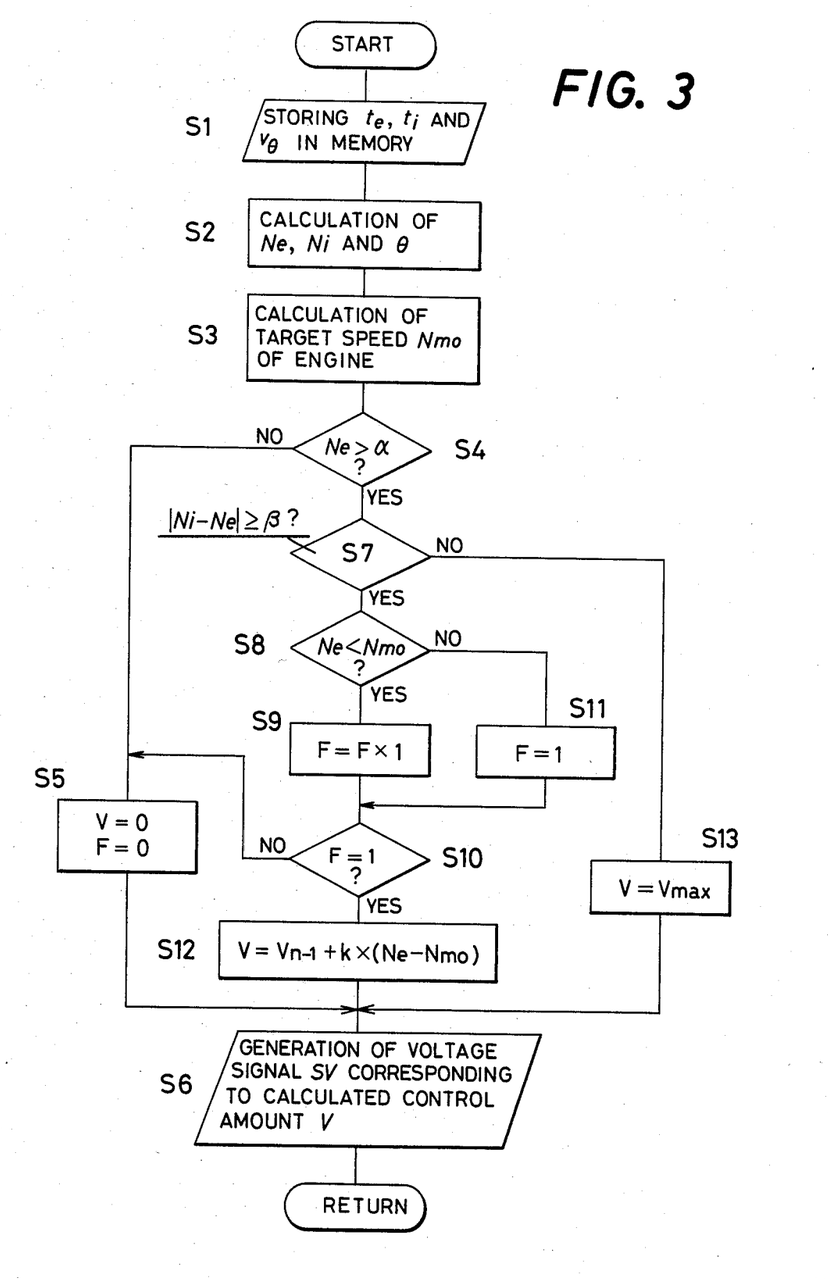
FIG. 3 is a flow chart illustrating the operation of the controlling apparatus of the invention of FIG. 1.
Figure 4:
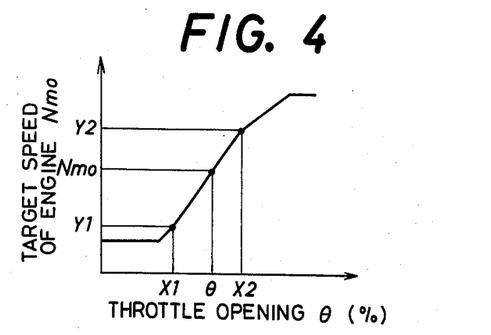
FIG. 4 is a graphical representation of a relationship between an engine speed and a throttle opening, which is represented by a data map or table stored in a read-only-memory of the controlling apparatus.
Figure 5:
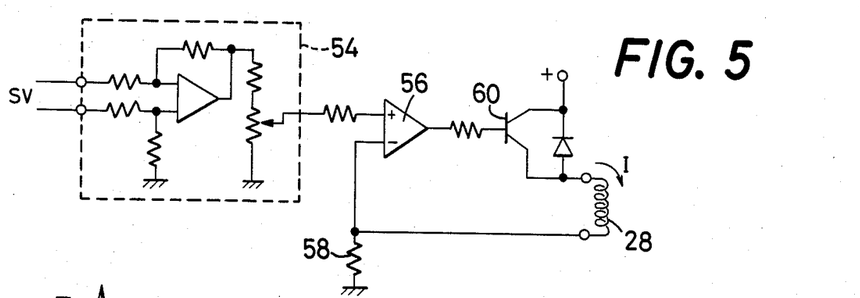
FIG. 5 is a diagram showing an electric circuit of a V/I converter of the controlling apparatus.

To the CPU 42 are connected, via a data bus line, a read-only-memory 46 (hereinafter called "ROM 46") and a random-access-memory 48 (hereinafter referred to as "RAM 48∞"). The ROM 46 stores information which includes a program represented in a flow chart of FIG. 3 which will be described, and a data map (data table) which is indicated in FIG. 4 and used for executing the above program of FIG. 3. The CPU 42 performs a data processing operation according to the stored program, while utilizing a temporary data storage function of the RAM 48. During the data processing operation, the CPU 42 determines a magnitude of electric current to be applied to the solenoid 28 of the electromagnetic clutch 12, and applies to a D/A converter 50 a coded signal which represents a control amount V indicative of the determined magnitude of current that should be applied to the solenoid 28. The D/A converter 50 converts the received coded signal into a corresponding voltage signal SV, which is then applied to a V/I converter (voltage-current converter) 52 arranged as illustrated in FIG. 5. Stated more specifically, the V/I converter 52 includes a signal-level converter circuit 54 which lowers the level of the signal SV, a differential amplifier 56 whose positive input receives the lowered signal SV, and a resistor 58 which is connected to a negative input of the differential amplifier 56. The resistor 58 is connected in series with the solenoid 28, and a comparatively low terminal voltage of the resistor 58 is applied to the negative input of the differential amplifier 56. In other words, the negative input of the amplifier 56 receives a signal representative of an electric current which is currently energizing the solenoid 28. Thus, the resistor 58 serves as a current sensor for detecting a magnitude of electric current acutally flowing through the solenoid 28. The differential amplifier 56 provides a transistor 60 with a base current, such that the difference in level between the signals received at the positive and negative inputs is equal to zero. The transistor 60 which is also a component of the V/I converter 52, is connected between a positive power source and the solenoid 28, and supplies the solenoid 28 with an electric current of a magnitude which varies corresponding to the output of the differential amplifier 56. Thus, the diferential amplifier 56 and transistor 60 serve as a current feedback regulator for varying an energization voltage of the solenoid 28 such that the magnitude of electric current to be applied to said solenoid coincides with the detected magnitude of electric current actually flowing through said solenoid, irrespective of a variation in impedance of the solenoid 28 due to change in temperature thereof.

The operation of the controlling apparatus constructed as discussed hitherto will be described with reference to the flow chart of FIG. 3.

At first, the CPU 42 executes a step S1 to store in the RAM 48 the interval "te" represented by the IGNITION signal SI, the interval "ti" represented by the ROTATION signal SR, and a voltage signal v$\theta$ corresponding to the opening angle $\theta$ of the throttle valve 32 represented by the THROTTLE signal ST. The step S1 is followed by a step S2 wherein the running speed Ne of the engine 10, rotating speed Ni of the rotor 26 of the electromagnetic clutch 14 (rotating speed of the input shaft 24), and the opening angle $\theta$ (%) of the throttle valve 32 are calculated based on the stored intervals "te" and "ti" and the voltage signal v$\theta$, and according to formulas (1), (2) and (3) indicated below.

$$Ne \text{ (r.p.m.)} = 60 \text{ sec.}/2 \times te \quad (1)$$

$$Ni \text{ (r.p.m.)} = 60 \text{ sec.}/ti \quad (2)$$

$$\theta \text{ (\%)} = [(v\theta - v \text{ min.})/(v \text{ max.} - v \text{ min.})] \times 100 \quad (3)$$

where,
v min.: voltage of the THROTTLE signal ST while the throttle valve 32 is fully closed (while the engine 10 is idling)
v max.: voltage of the THROTTLE signal ST while the valve 32 is fully open (while the engine 10 is running at its top speed)

In other words, the CPU 42 which executes the above step S2, cooperates with the ignition timing sensor 34, speed sesor 44 and throttle position sensor 36 to constitute means for detecting the actual speed Ne of the engine 10, means for detecting the rotating speed Ni of the rotor 26, and means for detecting the required output of the engine 10, respectively.

Then, the CPU 42 goes to a step S3 wherein a target speed Nmo of the engine 10 during a period of an engaging action of the yoke 22 and the rotor 26 is calculated based on the calculated opening angle $\theta$ of the throttle valve 32, i.e., based on the calculated required output of the engine 10. This step S3 corresponds to means for determining the target speed Nmo of the engine 10, as discussed below in more detail. In this connection, it is recognized that the speed of the engine 10 tends to be stabilized at a given level while the engagement of the electromagnetic clutch 12 is in progress, after the vehicle has been started. The "target speed" of the engine 10 means a speed to which the engine speed is controlled in a cyclic or continuous fashion until the clutch 12 has been completely engaged.

Described in detail, the data map or table stored in the ROM 46 represents a predetermined relationship between the opening angle $\theta$ of the throttle valve 32 and the target speed Nmo of the engine 10, these variables being taken along X and Y axes of a coordinate system, respectively, as shown in FIG. 4. When the target speed Nmo is obtained in the step S3, the CPU 42 refers to that data table to find a level of the target speed Nmo which corresponds to the actual opening angle $\theta$ of the throttle valve 32. Assuming that the actual opening angle $\theta$ is between points X1 and X2 of the X axis of the stored data map coordinate system, the target speed Nmo of the engine 10 corresponding to the detected opening angle $\theta$ of the throttle valve 32 is obtained by way of linear interpolation according to the following formula:

$$Nmo = [(Y2-Y1)/(X2-X1)] \times (\theta - X1) + Y1 \quad (4)$$

The CPU 42 then goes to a step S4 to check whether the detected actual speed Ne of the engine 10 is higher than a predetermined level $\alpha$ which is slightly higher than an idling speed of the engine 10. When the actual speed Ne is almost equal to the idling speed and not higher than the level $\alpha$, the CPU 42 goes to a step S5 wherein the control amount V representing the voltage signal SV to be applied to the V/I converter 52 is set at zero, and the content of a flag F indicating that the actual speed Ne has exceeded the target speed Nmo is set at zero. The step S5 is followed by a step S6 wherein the control amount V is output in the form of the voltage signal SV. In this stage of operation wherein the control amount V has been set at zero in the step S5, the voltage signal SV is absent and consequently no electric current is applied to the solenoid 28.

Figure 6:
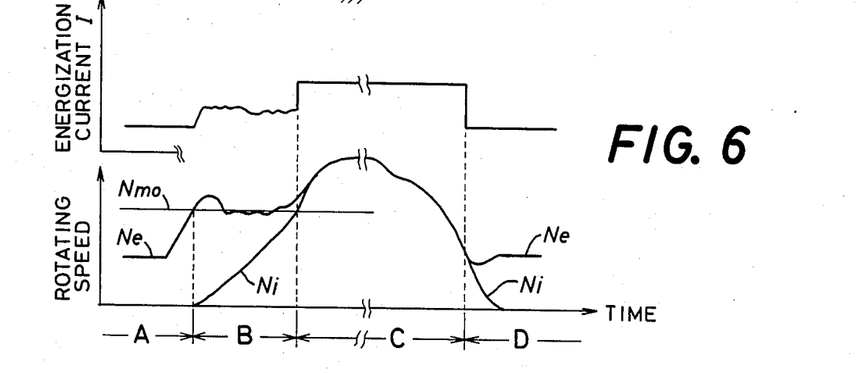
FIGS. 6 and 7 are timing charts showing the control operation of the controlling apparatus.

When the actual speed Ne of the engine 10 is elevated in response to the operator's depression on an accelerator pedal (not shown) to start the vehicle, the CPU 42 judges that the actual speed Ne has exceeded the predetermined level $\alpha$, and goes to a step S7 wherein the CPU 42 checks to see whether a difference between the actual speed Ne of the engine 10 (rotating speed Ne of the yoke 22) and the rotating speed Ni of the input shaft 24 (rotor 26) is greater than a predetermined value $\beta$. This value $\beta$ is an extremely small value which is equivalent to an unavoidable error of calculation of the difference between the values Ne and Ni. Stated the other way, while the difference between the values Ne and Ni is greater than the value $\beta$, it means that the yoke 22 and the rotor 26 are in the process of enagement with each other, i.e., the electromagnetic clutch 12 is in its engaging action (the engagement of the clutch 12 has not been completed). In this instance, the CPU 42 goes to a step S8 to check if the actual speed Ne of the engine 10 is lower than the target speed Nmo. If the speed Ne is lower than the speed Nmo, a step S9 is executed to obtain a logical product of the previous content of the flag F and the value "1" (one), so that the previous content of the flag F is replaced by the obtained product. At this moment, however, the previous content of the flag F is 0 (zero), and therefore the logical product obtained in the step S9 is zero, whereby the new content of the flag F remains zero. Subsequently, the step S9 is followed by a step S10 wherein the CPU 42 checks whether the content of the flag F is 1 (one) or not. Since the current content of the flag F is zero, the CPU 42 goes to the previously stated steps S5 and S6, and the electric current "I" to be applied to the solenoid 28 remains zero. This condition stated above is indicated by a time span A in the timing chart of FIG. 6.

While the above steps are repeatedly performed, the actual speed Ne of the engine 10 is raised, and the CPU 42 judges in the step S8 that the actual speed Ne has exceeded the target speed Nmo. In this instance, the CPU 42 goes to a step S11 wherein the content of the flag F is set to 1 (one), and then to the step S10 to check if the current content of the flag F is 1 (one) or not. Since the content of the flag F has been set at 1 (one) in the step S11, the step S10 is followed by a step S12 wherein the control amount V is updated by adding a value $[K \times (Ne-Nmo)]$ to the previous value $V_{n-1}$, where K is a constant. That is, the control amount V is determined in the step S12 such that the difference between the actual speed Ne and the target speed Nmo is zero, i.e., the actual speed Ne coincides with the target speed Nmo. Then, the step S6 is executed, wherein the voltage signal SV is produced to supply the solenoid 28 with the electric current "I" of a magnitude corresponding to the control amount V determined in the step S12. While the engagement of the electromagnetic clutch 12 is in progress, the above discussed steps are repeated so that the actual running speed Ne of the engine 10 becomes identical with the target speed Nmo (determined in the step S3), through the current feedback previously discussed with reference to FIG. 5. This controlling process for coincidence of the actual speed Ne with the target speed Nmo is indicated by a time span B of FIG. 6. It is noted that the step 12 corresponds to current adjusting means for controlling the magnitude of the electric current.

While the rotating speed Ni of the rotor 26 is increased, the above steps are repeated until the CPU 42 judges in the step S7 that the difference between the speed Ni of the rotor 26 and the speed Ne of the yoke 22 has become smaller than the predetermined value $\beta$, in other words, until the engaging action of the electromagnetic clutch 12 has been completed. Upon completion of the engaging action of the clutch 12, the step S7 is followed by a step S13 wherein the control amount V is set to the predetermined maximum (V max.), and then the step S13 is followed by the step S6 wherein the voltage signal SV corresponding to the maximum control amount V max. is generated, whereby the maximum magnitude of electric current "I" is supplied to the solenoid 28 of the clutch 12 to maintain the complete engagement of the clutch (Ne=Ni). This condition is indicated by a time span C of FIG. 6.

Figure 7:
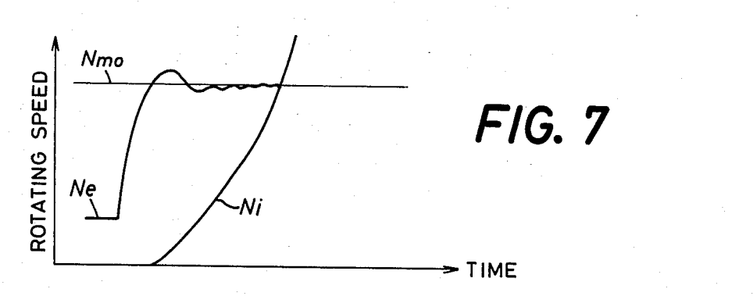

When the actual speed Ne of the engine 10 has been lowered below the predetermined level $\alpha$ (slightly above the idling speed) as a result of a release of the operator's foot from the accelerator pedal, the CPU 42 recognizes this fact and goes to the step S5, whereby the control amount V and the content of the flag F are both zeroed. Accordingly, the rotation of the rotor 26 (input shaft 24) is stopped while the engine 10 is kept running at its idling speed. This process is indicated by a time span D of FIG. 6. It is noted that when the opening angle θ of the throttle valve 32 is comparatively large, the accordingly high target speed Nmo is established. In this case, the running speed Ne of the engine 10 is controlled as illustrated in FIG. 7, whereby the vehicle can run with a high level of drivability and fuel economy.

As described hitherto, the instant embodiment of the controlling method and apparatus permit the actual speed Ne of the engine 10 to promptly reach the target speed Nmo which has been determined corresponding to the specific opening angle θ of the throttle valve 32, for example upon starting of the vehicle. Further, the control amounts V is adjustaed so that the actual speed Ne is held close to the target speed Nmo, whereby the conventional need for unnecessarily high speed running of the engine 10 is minimuzed, and consequently the specific fuel consumption is improved while the drivability is held satisfactory. Furthermore, the instant method and apparatus are capable of eliminating the possibility that a variation in torque transmission characteristics between electromagnetic clutches (12) may induce a variation or difference in drivability and specific fuel consumption between different vehicles in which the clutches (12) are built.

Figure 8:
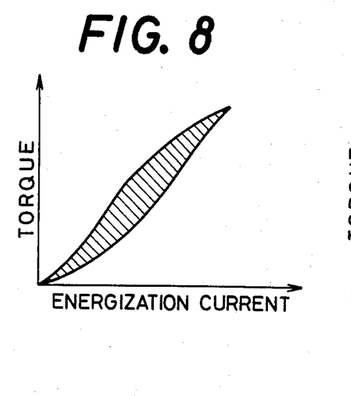
FIG. 8 is a graph showing a variation in the generally known characteristics of the electromagnetic clutch of FIG. 2.
Figure 9:
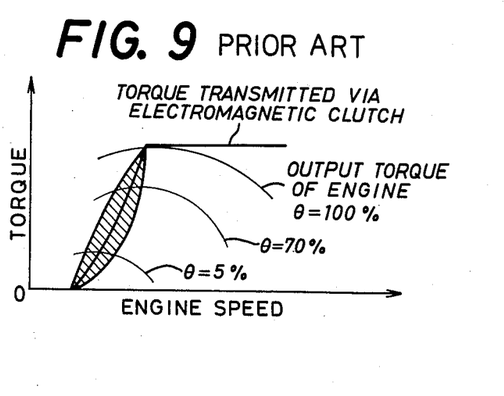
FIG. 9 is a graph showing a variation in relationship between a torque transmitted by an electromagnetic clutch and an engine speed, where the clutch is controlled with a known method or apparatus.

Stated in greater detail, while the electromagnetic clutches (12) have the torque transmission characteristics as generally indicated in FIG. 2, the characteristics are more or less varied from one clutch to another, within a range as indicated by a hatched area in FIG. 8, due to differences in dimensions of the annular space or gap formed between the yoke 22 and the rotor 26, and due to differences in operating temperature and cumulative operating time of the clutches. According to the known method, the application of the same magnitude of electric current will produce different torque transmitting results from one clutch to another. In the known method for controlling a clutch similar to the clutch 12, the torque of the clutch is increased according to a predetermined relation as shown by a solid line of FIG. 9, on the assumption that electromagnetic clutches to be controlled have the same torque transmission characteristics. In fact, however, the individual clutches have different characteristics as previously described, and therefore the relation between the transmitted torque and the engine speed is varied from one clutch to another, within a range as indicated by a hatched area in FIG. 9. This variation causes differences in drivability and fuel economy between the vehicles. Conventionally, the rate of increase of the energization current is selected relatively low, so that the drivability, rather than the fuel economy, is maintained at a satisfactory level. As a result, the speed of the engine tends to be unnecessarily high, causing a loss of output of the engine. Thus, the fuel economy at the start of the vehicle is sacrificed to some extent for the sake of the drivability. Contrary to the conventional arrangement indicated above, the controlling method and apparatus of the invention are adapted to control an electromagnetic clutch, at the time of starting the vehicle, so that the engine speed Ne coincides with the target speed Nmo determined by the throttle opening angle θ, as indicated by the solid line of FIG. 9. Hence, a variation in torque transmission characteristics from one clutch to another will not affect the engaging action of the clutch controlled by the present method or apparatus. That is, all electromagnetic clutches controlled according to the present invention have the identical characteristics of engagement, which assures uniform drivability and fuel economy on all vehicles using these clutches.

While the embodiment of the invention has been described hitherto with reference to the accompanying drawing, the invention may be otherwise embodied.

For example, a circular interpolation or other methods, in place of a liner interpolation, may be used in the step S8 to obtain the target speed Nmo from the stored data map of FIG. 4. Further, the stored data map may be replaced by a stored formula which represents a relation between the throttle opening angle θ and the target speed Nmo.

Although the required output of the engine is determined based on the opening angle θ of the throttle valve 32, the required output may be obtained based on other quantities such as: an amount of depression of the accelerator pedal; a vacuum pressure in the intake manifold; an amount of injection of fuel (where the engine 10 is a diesel engine, or of a fuel injection type); a rate of increase of the engine speed.

Further, the addition in the step S12 of the value $[K \times (Ne - Nmo)]$ to the control amount $(V_{n-1})$ of the preceding cycle may be replaced by the multiplication of these two values.

As another modification, the V/I converter 52 may be replaced by an amplifier which amplifies the voltage of the voltage signal SV. In this case, assuming the resistance of the solenoid 28 is constant, the application of an energization voltage corresponding to the control amount V to the solenoid 28 will induce a flow of energization current corresponding to the control amount V.

It will be obvious that other changes and modifications may be made in the invention without departing from the spirit and scope of the invention defined in the appended claims.

What is claimed is:

1. A method of controlling an electromagnetic clutch which is incorporated in a power transmission system of a vehicle to transmit an output of an engine to drive wheels, and which includes a solenoid, said method comprising the steps of:
   detecting a required output of said engine;
   determining a target speed of said engine, based on the detected required output of the engine, and according to a predetermined relation between said target speed and said required output of the engine;
   applying an electric current to said solenoid to effect an engaging action of the electromagnetic clutch to transmit a torque of the engine to the drive wheels; and
   controlling a magnitude of said electric current to be applied to said solenoid during a period of said engaging action of the electromagnetic clutch, to vary the torque to be transmitted by said clutch, as a function of the controlled magnitude of said electric current, such that an actual speed of the engine coincides with the determining target speed of the engine.

2. An apparatus for controlling an electromagnetic clutch which is incorporated in a power transmission system of a vehicle to transmit an output of an engine to drive wheels, and which includes a solenoid, said apparatus comprising:
   first detecting means for detecting an actual speed of said engine;
   second detecting means for detecting a currently required output of said engine;

means for determining a target speed of said engine, based on the detecting required output of the engine, and according to a predetermined relation between said target speed and said required output of the engine;

means for applying an electric current to said solenoid to effect an engaging action of the electromagnetic clutch to transmit a torque of the engine to the drive wheels; and current adjusting means for controlling a magnitude of said electric current to be applied from said current applying means to said solenoid during a period of said engaging action of the electromagnetic cutch, to vary the torque to be transmitted by said clutch, as a function of the controlled magnitude of said electric current, such that an actual speed of the engine coincides with the determining target speed of the engine.

3. An apparatus as claimed in claim 2, wherein said electromagnetic clutch further includes: a driving rotary member operatively connected to said engine; a driven rotary member operatively connected to said drive wheels and cooperating with said driving rotary member to define an annular space therebetween; and a mass of magnetic powder accommodated in said annular space, particles of said magnetic powder being tightly bonded together upon energization of said solenoid, such that said mass of magnetic powder transmits said torque from said driving rotary member to said driven rotary member at a rate of transmission corresponding to said magnitude of electric current.

4. An apparatus as claimed in claim 2, wherein said first detecting means comprises a sensor disposed on an ignition system for said engine and detecting an ignition signal applied to said ignition system, for detecting said actual speed of the engine.

5. An apparatus as claimed in claim 2, wherein said second detecting means comprises a sensor for detecting an angle of opening of a throttle valve disposed in an intake manifold connected to said engine.

6. An apparatus as claimed in claim 2, wherein said current adjusting means comprises a current sensor for detecting a magnitude of electric current actually flowing through said solenoid, and a current feedback regulator for varying an energization voltage of said solenoid such that the magnitude of electric current to be applied to said solenoid coincides with the detected magnitude of electric current actually flowing through said solenoid, irrespective of a variation in impedance of said solenoid.

* * * * *

UNITED STATES PATENT AND TRADEMARK OFFICE
CERTIFICATE OF CORRECTION

PATENT NO. : 4,623,052

DATED : November 18, 1986

INVENTOR(S) : Tomoyuki Watanabe et al

It is certified that error appears in the above-identified patent and that said Letters Patent is hereby corrected as shown below:

-- In Section /30/ the number of the priority document is incorrectly recorded. The number should read:

58-144026 not 58-14426 --

Signed and Sealed this

Third Day of February, 1987

Attest:

DONALD J. QUIGG

Attesting Officer

Commissioner of Patents and Trademarks